UNITED STATES PATENT OFFICE.

SÖREN LEMVIG FOG AND AAGE GEORG KIRSCHNER, OF COPENHAGEN, DENMARK.

HEADLESS MATCH.

SPECIFICATION forming part of Letters Patent No. 676,883, dated June 25, 1901.

Original application filed December 5, 1898, Serial No. 698,247. Divided and this application filed January 13, 1900. Serial No. 1,323. (No specimens.)

*To all whom it may concern:*

Be it known that we, SÖREN LEMVIG FOG and AAGE GEORG KIRSCHNER, subjects of the King of Denmark, and residents of Copenhagen, in the Kingdom of Denmark, have invented certain new and useful Improvements in Headless Matches, (for which we have applied for patents in Germany, dated October 24, 1898; in Austria, dated November 5, 1898; in Hungary, No. 15,734, dated November 5, 1898; in France, No. 270,574, dated November 4, 1898; in Belgium, No. 108,659, dated November 3, 1898; in Italy, dated November 4, 1898; in Spain, dated November 5, 1898; in Portugal, dated November 7, 1898; in Sweden, No. 1,695, dated November 2, 1898; in Norway, No. 10,435, dated November 5, 1898; in Denmark, No. 1,162, dated October 31, 1898; in England, No. 22,955, dated November 1, 1898; in Finland, dated April 24, 1899; in Canada, No. 83,818, dated November 28, 1898; in Russia, No. 6,047, dated October 28, 1898; in Mexico, dated July 1, 1899; in Argentina, dated May 20, 1899; in Chile, dated January 25, 1899; in Brazil, dated December 9, 1899; in India, No. 448, dated December 8, 1898; in Turkey, dated June 20, 1899; in Tunis, dated August 3, 1898, and in Switzerland, dated May 12, 1899,) of which the following is a specification.

The present invention relates to a headless match consisting of a stick of wood that is impregnated at one or both ends with chlorate of barium, and this application is a division of our application, Serial No. 698,247, filed December 5, 1898.

Headless matches are already known; but such are made by impregnating the sticks with chlorate of sodium. These matches cannot stand the tests of practice, because owing to the hygroscopic property of the chlorate of sodium they absorb moisture from the atmosphere, and so become useless.

Chlorate of barium possesses many very considerable advantages and excels all other chlorates for making headless matches. A short consideration of the different chlorates shows that chlorate of barium is especially suitable for making headless matches. Chlorate of calcium, for example, is too hygroscopic, and the matches made by impregnating sticks with this chlorate soon absorb water and become useless. Chlorate of sodium is soluble in the proportion of three hundred and twenty-five parts of chlorate of sodium to one hundred parts of water. This salt is not so hygroscopic as chlorate of calcium; but still it is too hygroscopic to be utilizable for making headless matches. Chlorate of potassium, unlike chlorate of calcium and chlorate of sodium, is not sufficiently soluble in water, as only fifty parts of this salt can be dissolved in one hundred parts of water. The solutions of chlorate of potassium are consequently too weak and on dipping the sticks of wood into the solution sufficient salt is not absorbed. Experience has shown that practical headless matches cannot be produced by impregnating the sticks with chlorate of potassium alone. Chlorate of barium can be dissolved in water in the proportion of one hundred and twenty-five parts of the chlorate to one hundred parts of water. This salt is not hygroscopic, but, on the contrary, loses part of its water of crystallization after a short time, so that the matches made by impregnating sticks with barium chlorate improve by being kept. Further, chlorate of barium is sufficiently soluble in water so that on dipping the sticks of wood into the boiling solution sufficient salt is absorbed to produce a practical match.

In making these matches care must be taken that the chlorate of barium does not rise too high in the wood on dipping the sticks into the solution, as otherwise a kind of firework would be produced instead of a match. This can be avoided by making the sticks quite wet before they are dipped into the solution of barium chlorate. This is done by steeping bundles of the sticks secured in a frame in water for about twenty minutes. The bundles are dipped into the boiling solution of the chlorate of barium when the sticks are still quite wet. By this means the chlorate is only absorbed by the sticks up to the level to which they are dipped.

Instead of a pure solution of chlorate of barium some chlorate of potassium may be added in some cases; but still only a small quantity of the latter may be used.

The matches made according to the present invention are distinguished from all others by the extreme simplicity of their production, inasmuch as the sticks of wood do not need to be paraffined or prepared in any other manner.

The sticks of wood having been cut in the usual manner have only to be made wet and dipped into the solution of the chlorate of barium in order to produce excellent matches. Further, it should be especially observed that on impregnating the sticks they do not require to be secured in special frames, so as to provide a space between each; but they can be secured in bundles, in which the separate sticks bear against each other.

A principal advantage of these matches over the usual match is that there is no head by the glowing of which part considerable injury has so often been done to carpets, covers, &c. After the impregnated end has been ignited the flame passes to the wood, and the impregnated end soon becomes quite cold, so that even in the event of this end breaking off there is no danger of fire nor of the hands being burned.

These matches can be impregnated at one or at both ends, and if they are only impregnated at one end this end can be indicated in some manner—as, for example, by rounding off the wood or by color. The matches are ignited on surfaces prepared in a similar manner as those used for Swedish matches.

What we claim, and desire to secure by Letters Patent of the United States, is—

1. A match containing at its ignition end chlorate of barium.

2. A match, the stick or splint of which is impregnated with chlorate of barium.

3. A match, the stick or splint of which is impregnated with an oxy salt of a halogen and barium.

4. A match, the stick or splint of which contains chlorate of barium and chlorate of another metal.

5. A match, the stick or splint of which contains chlorate of barium and chlorate of potassium, substantially as set forth.

In testimony whereof we have hereunto set our hands in the presence of two witnesses.

SÖREN LEMVIG FOG.
AAGE GEORG KIRSCHNER.

Witnesses:
C. BLEEHINGBERG,
FR. SLAVENIÜS.